United States Patent
Kim et al.

(10) Patent No.: US 9,257,064 B2
(45) Date of Patent: Feb. 9, 2016

(54) STEREOSCOPIC IMAGE DISPLAY

(71) Applicant: LG Display Co., Ltd., Seoul (KR)

(72) Inventors: Jeongki Kim, Paju-si (KR); Seungho Baek, Paju-si (KR); Jooah Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 617 days.

(21) Appl. No.: 13/645,927

(22) Filed: Oct. 5, 2012

(65) Prior Publication Data

US 2013/0088654 A1    Apr. 11, 2013

(30) Foreign Application Priority Data

Oct. 5, 2011 (KR) .................. 10-2011-0101311

(51) Int. Cl.
| | |
|---|---|
| G09G 3/36 | (2006.01) |
| G09G 5/00 | (2006.01) |
| G09G 3/00 | (2006.01) |
| G02B 27/22 | (2006.01) |
| G02B 27/26 | (2006.01) |
| H04N 13/04 | (2006.01) |

(52) U.S. Cl.
CPC ............ *G09G 3/003* (2013.01); *G02B 27/2264* (2013.01); *G02B 27/26* (2013.01); *G09G 3/3648* (2013.01); *H04N 13/0434* (2013.01); *H04N 13/0454* (2013.01); *G09G 2300/0426* (2013.01); *G09G 2300/0443* (2013.01); *G09G 2300/0876* (2013.01)

(58) Field of Classification Search
CPC ................ G09G 3/003; G09G 3/3648; G09G 2300/0426; G09G 2300/0876; G09G 2300/08; G09G 2300/0809; G09G 2320/0209; H04N 13/0454
USPC ........... 345/7–9, 87–104; 349/15; 348/42, 46, 348/51, 52
See application file for complete search history.

(56) References Cited

U.S. PATENT DOCUMENTS

| | | | | |
|---|---|---|---|---|
| 8,810,569 | B2 * | 8/2014 | Hwang | .......................... 345/419 |
| 8,896,499 | B2 * | 11/2014 | Park et al. | .......................... 345/6 |
| 2010/0265230 | A1 | 10/2010 | Kang | |
| 2011/0227886 | A1 * | 9/2011 | Lee et al. | ...................... 345/204 |

FOREIGN PATENT DOCUMENTS

| | | |
|---|---|---|
| CN | 102914874 A | 2/2013 |
| JP | 2002-185983 A | 6/2002 |

OTHER PUBLICATIONS

State Intellectual Property Office of the People's Republic of China, First Office Action, Chinese Patent Application No. 201210371117.1, May 23, 2014, ten pages.

* cited by examiner

*Primary Examiner* — Jimmy H Nguyen
(74) *Attorney, Agent, or Firm* — Fenwick & West LLP

(57) ABSTRACT

A stereoscopic image display includes a liquid crystal display panel including a plurality of pixels, each of which is divided into a main pixel unit and an switchable black stripe, a data driving circuit, a gate driving circuit, and a 3D control voltage generation circuit, which supplies AC voltages, of which phases are sequentially shifted, to a plurality of 3D control lines in a 3D mode.

7 Claims, 14 Drawing Sheets

(SF3)

(SF4)

STEREOSCOPIC IMAGE DISPLAY

CROSS-REFERENCE TO RELATED APPLICATIONS

This application claims priority under 35 U.S.C. 119(a) of Korean Patent Application No. 10-2011-0101311, filed on Oct. 5, 2011, which is incorporated by reference in its entirety.

BACKGROUND

1. Technical Field

The embodiments disclosed herein relate to a stereoscopic image display.

2. Discussion of the Related Art

A glasses type stereoscopic image display for displaying three-dimensional (3D) images is classified into a polarized glasses type stereoscopic image display and a shutter glasses type stereoscopic image display. The polarized glasses type stereoscopic image display requires a polarization separation device, such as a patterned retarder, to be attached to a display panel. The patterned retarder separates polarized light of a left eye image and a right eye image displayed on the display panel. A viewer wears polarized glasses when viewing a stereoscopic image on the polarized glasses type stereoscopic image display. Hence, the viewer sees polarized light of the left eye image through a left eye filter of the polarized glasses and polarized light of the right eye image through a right eye filter of the polarized glasses, resulting in the viewer experiencing a stereoscopic feeling.

The display panel of the existing polarized glasses type stereoscopic image display may use a liquid crystal display panel. A parallax is generated between a pixel array of the liquid crystal display panel and the patterned retarder due to a thickness of an upper glass substrate of the liquid crystal display panel and a thickness of an upper polarizing plate, and thus leads to a poor vertical viewing angle. When the viewer views a stereoscopic image displayed on the polarized glasses type stereoscopic image display at a vertical viewing angle higher or lower than the front of the liquid crystal display panel, the viewer may perceive 3D crosstalk, where the left eye image and the right eye image overlap each other, when viewing the stereoscopic image with a single eye (i.e., the left eye or the right eye).

To solve the problem of the 3D crosstalk at the vertical viewing angle in the polarized glasses type stereoscopic image display, Japanese Laid Open Patent Publication No. 2002-185983 proposed a method for forming black stripes on a patterned retarder (or 3D film) of a stereoscopic image display. In a method different from this method, the width of black matrices formed on a liquid crystal display panel can be increased. However, the formation of the black stripes on the patterned retarder may result in a reduction in luminance of two-dimensional (2D) and 3D images, and the black matrices may interact with the black stripes, thereby generating a Moiré pattern. Further, an increase in the width of the black matrices may reduce an aperture ratio, thereby reducing the luminance of the 2D and 3D images.

To solve the problem of the black stripes, a technology for dividing each of pixels of a display panel into two parts and controlling one of the two parts as a switchable black stripe was disclosed in U.S. Patent Application Publication No. US 2010/0265230 corresponding to U.S. patent application Ser. No. 12/536,031 filed on Aug. 5, 2009. The stereoscopic image display proposed by the present applicant divides each of the pixels into the two parts and writes 2D image data to each of the divided pixels in a 2D mode to thereby prevent a reduction in a luminance of a 2D image, and also widens a vertical viewing angle of a 3D image in a 3D mode. Hence, the stereoscopic image display proposed by the present applicant may improve the visibility of both the 2D and 3D images and may provide more excellent display quality than the existing stereoscopic image display. The switchable black stripe may include a thin film transistor (TFT) and a liquid crystal cell.

In the switchable black stripe technology, which has been already proposed by the present applicant, a voltage of the liquid crystal cell has to be discharged to a voltage of a black gray level in the 3D mode. To this end, a relatively high 3D control voltage of DC type may be applied to a gate electrode of the TFT of the switchable black stripe, so that an on-current may flow in the TFT of the switchable black stripe for a predetermined period of time. In this instance, the TFT of the switchable black stripe may undergo degradation of driving characteristics, including a shift of a threshold voltage, because of its gate bias stress.

The 3D control voltage of the switchable black stripe may be converted from the DC type to AC type in consideration of the problem. Hence, the gate bias stress of the TFT may be compensated. However, a gate voltage of the TFT may change because of the coupling between a line supplied with the 3D control voltage and a common electrode supplied with a common voltage. Hence, the common voltage may change, and luminance of the pixels may change. As a result, when the luminance of the pixels changes due to the changes in the 3D control voltage, a noise may appear in the display panel.

SUMMARY

The embodiments disclosed herein provide a stereoscopic image display capable of reducing degradation of driving characteristics of thin film transistors included in switchable black stripes and preventing or reducing a noise generated when a gate voltage of the thin film transistors changes.

In one aspect, there is a stereoscopic image display including a liquid crystal display panel including data lines, gate lines crossing the data lines, a common electrode to which a common voltage is supplied, a plurality of 3D control lines to which an AC voltage is supplied, and a plurality of pixels, each of which is divided into a main pixel unit and a switchable black stripe, a data driving circuit configured to supply a data voltage of a 2D image to the data lines in a 2D mode and supply a data voltage of a 3D image to the data lines in a 3D mode, a gate driving circuit configured to sequentially supply a gate pulse, which swings between a gate low voltage and a gate high voltage, to the gate lines in the 2D mode and the 3D mode, and a 3D control voltage generation circuit configured to supply AC voltages, of which phases are sequentially shifted, to the plurality of 3D control lines in the 3D mode.

Each of the switchable black stripes is discharged up to a voltage of a black gray level during the high voltage period of each of the AC voltages supplied through the 3D control lines.

Figure 1:
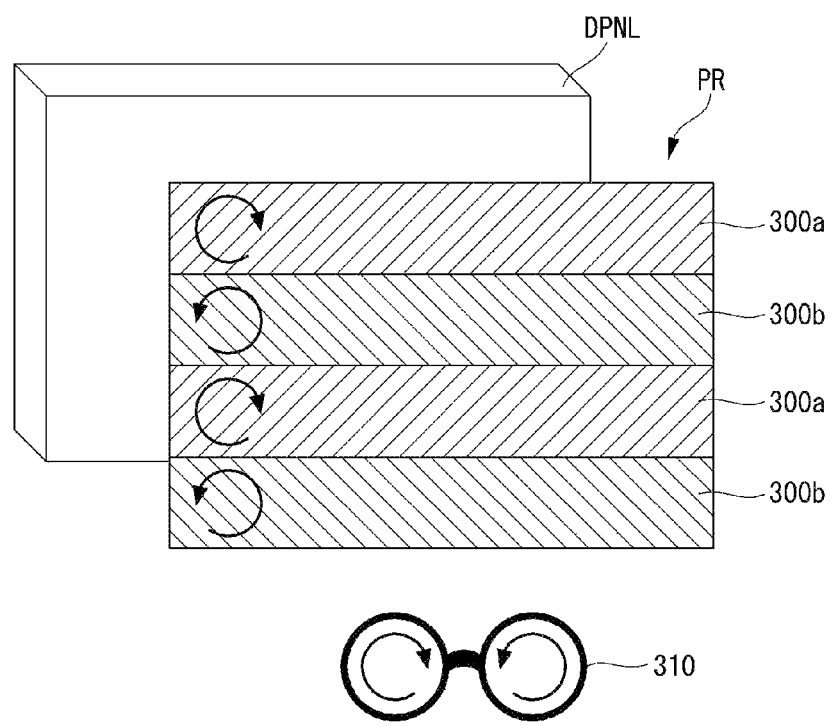
FIG. 1 illustrates a stereoscopic image display according to one embodiment.

The drawings depict, and the detail description describes, various non-limiting embodiments for purposes of illustration only. One skilled in the art will readily recognize from the following discussion that alternative embodiments of the structures and methods illustrated herein may be employed without departing from the principles described herein.

DETAILED DESCRIPTION

The invention will be described more fully hereinafter with reference to the accompanying drawings, in which example embodiments of the inventions are shown. This invention may, however, be embodied in many different forms and should not be construed as limited to the embodiments set forth herein. Like reference numerals designate like elements throughout the specification. In the following description, if it is decided that the detailed description of known function or configuration related to the invention makes the subject matter of the invention unclear, the detailed description is omitted.

A stereoscopic image display according to one embodiment may be implemented based on a liquid crystal display. The liquid crystal display may be implemented as any type liquid crystal display including a transmissive liquid crystal display, a transflective liquid crystal display, and a reflective liquid crystal display. The transmissive liquid crystal display and the transflective liquid crystal display require a backlight unit which is omitted in the drawings. The backlight unit may be implemented as a direct type backlight unit or an edge type backlight unit.

As shown in FIGS. 1 to 4, the stereoscopic image display according to one embodiment includes a liquid crystal display panel DPNL, a patterned retarder PR, and polarized glasses 310.

Figure 2:
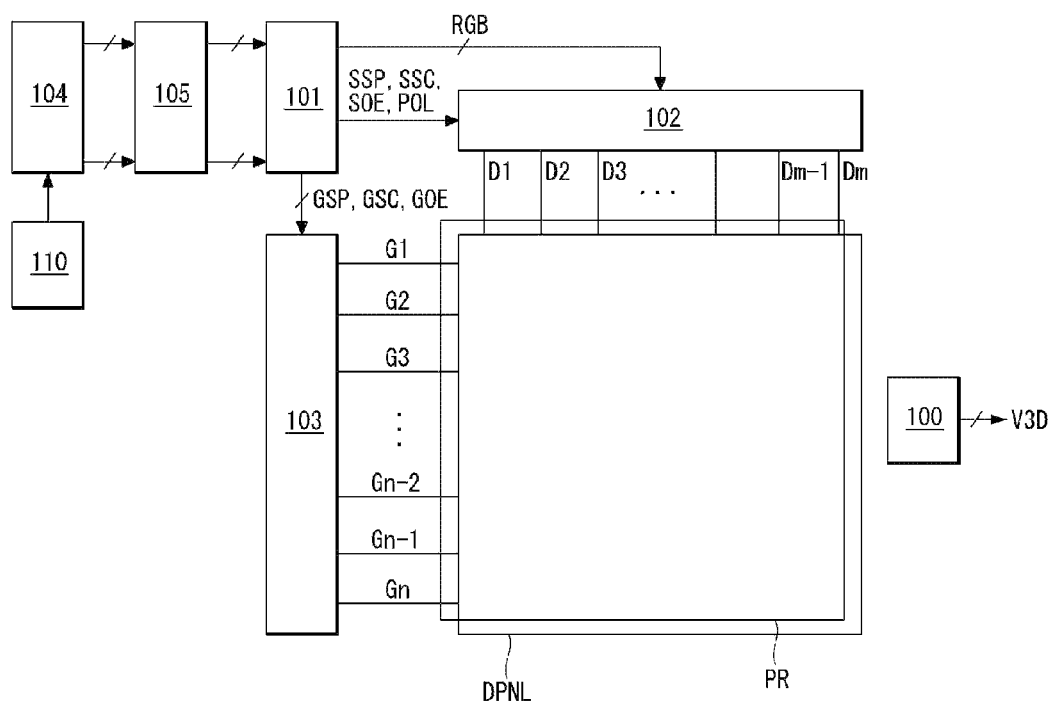
FIG. 2 is a block diagram illustrating driving circuits of the stereoscopic image display shown in FIG. 1 according to one embodiment.
Figure 3:
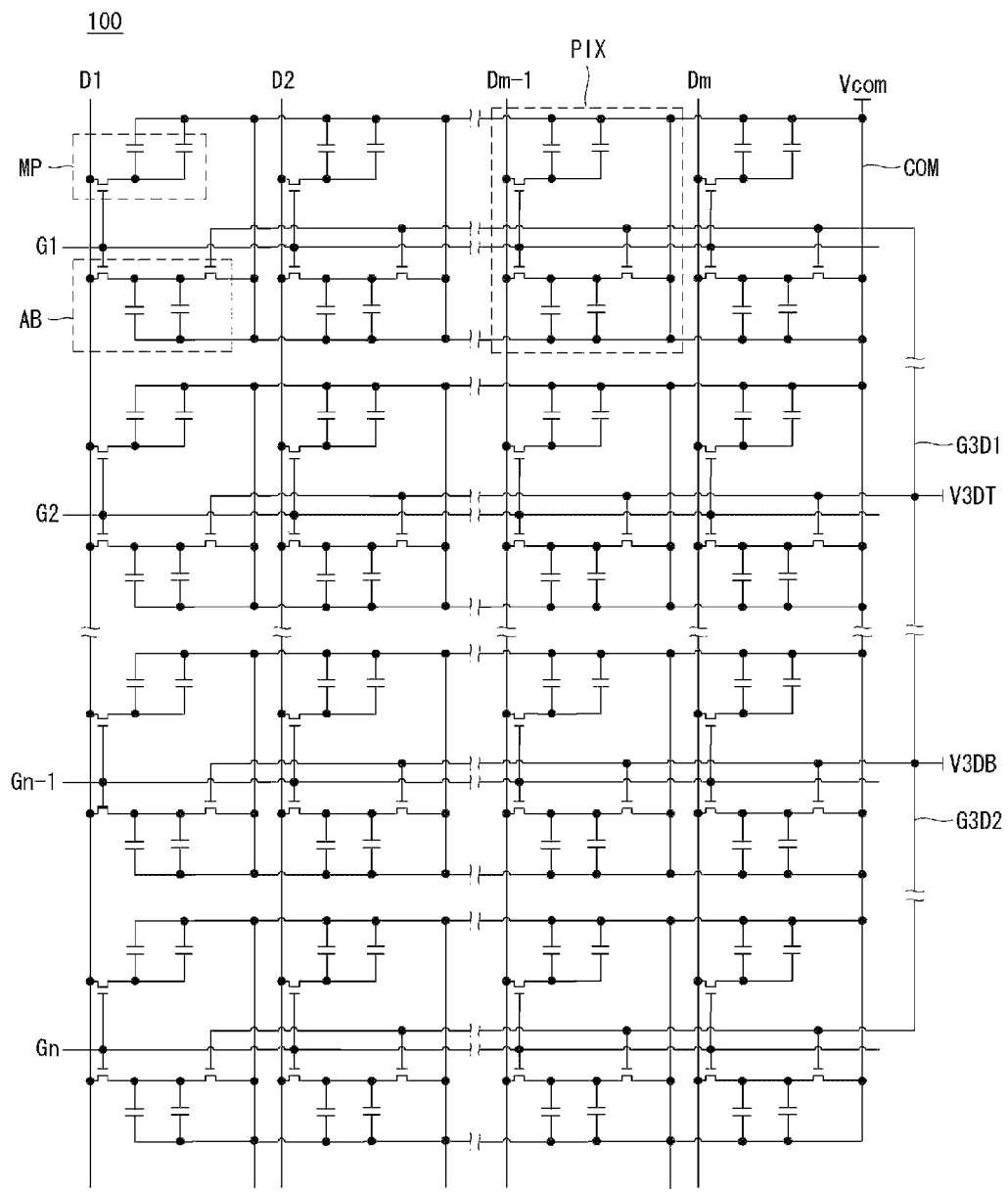
FIG. 3 is an equivalent circuit diagram of a pixel array of a liquid crystal display panel shown in FIG. 1 according to one embodiment.

The liquid crystal display panel DPNL displays a 2D image in a 2D mode and displays a 3D image in a 3D mode. The liquid crystal display panel DPNL includes a liquid crystal layer (not shown) formed between two glass substrates. The liquid crystal display panel DPNL includes a plurality of pixels disposed in a matrix form based on a crossing structure of data lines D1 to Dm and gate lines G1 to Gn, where m and n are a positive integer as shown in FIG. 2 and FIG. 3.

On a thin film transistor (TFT) array substrate of the liquid crystal display panel DPNL, the data lines D1 to Dm (shown in FIG. 3), the gate lines G1 to Gn (shown in FIG. 3), 3D control lines G3D1 and G3D2 (shown in FIG. 3), first to third thin film transistors (TFTs) T1 to T3 (shown in FIG. 4), pixel electrodes PIX1 and PIX2 (shown in FIG. 4), common electrodes COM1 and COM2 (shown in FIG. 4), a common voltage supply line COM connected to the common electrodes COM1 and COM2 (shown in FIG. 4), and storage capacitors Cst1 and Cst2 (shown in FIG. 4) are formed. The first to third TFTs T1, T2, and T3 supply a data voltage form the data lines D1 to Dm to the pixel electrodes PIX1 and PIX2 in response to a gate pulse from the gate lines G1 to Gn.

On a color filter array substrate of the liquid crystal display panel DPNL, black matrices, color filters, etc. are formed. An upper common electrode may be formed on the color filter array substrate.

Polarizing plates (not shown) are respectively attached to the TFT array substrate and the color filter array substrate of the liquid crystal display panel DPNL. Alignment layers for setting a pre-tilt angle of liquid crystals are respectively formed on the surfaces contacting the liquid crystals in the TFT array substrate and the color filter array substrate. A column spacer may be formed between the TFT array substrate and the color filter array substrate to keep a cell gap of the liquid crystal layer of the liquid crystal display panel DPNL constant.

The liquid crystal display panel DPNL is not limited to the above-described structure and may be implemented in any well-known liquid crystal mode. For example, the liquid crystal display panel DPNL may be implemented in a vertical electric field driving manner such as a twisted nematic (TN) mode and a vertical alignment (VA) mode and a horizontal electric field driving manner such as an in-plane switching (IPS) mode and a fringe field switching (FFS) mode.

Each of the pixels of the liquid crystal display panel DPNL includes a liquid crystal cell and may include a red subpixel, a green subpixel, and a blue subpixel. Each pixel may further include other subpixels. For example, each pixel may further include at least one of white, cyan, and magenta subpixels.

Figure 4:
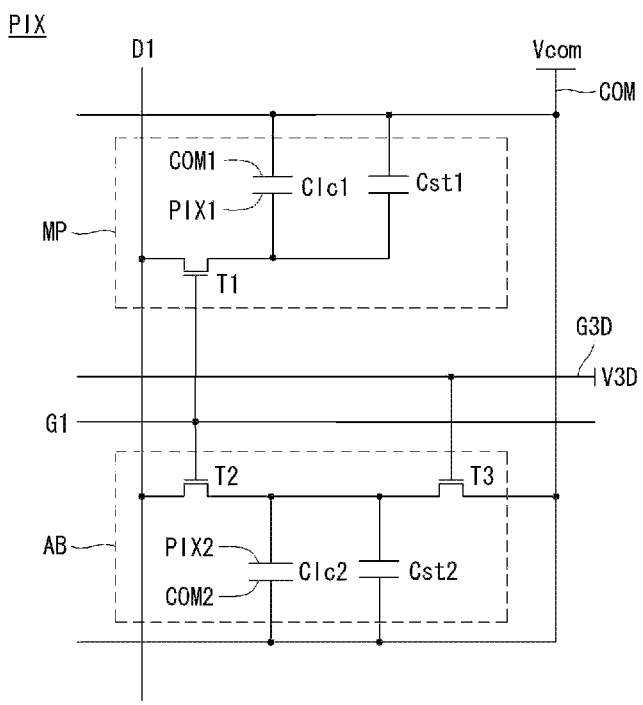
FIG. 4 is a circuit diagram of one subpixel of the pixel array shown in FIG. 3 according to one embodiment.

Each pixel PIX includes a main pixel unit MP (refer to FIGS. 3 and 4) and an switchable black stripe AB (refer to FIGS. 3 and 4).

The main pixel unit MP displays video data of a 2D image in the 2D mode and displays video data of a 3D image in the 3D mode. On the other hand, the switchable black stripe AB serves as a pixel for displaying the video data of the 2D image in the 2D mode, but is discharged to a level of a common voltage and represents a black gray level in the 3D mode, thereby serving as a black stripe. Accordingly, the switchable black stripe AB increases an aperture ratio and a luminance of the 2D image in the 2D mode and widens a vertical viewing angle of the 3D image in the 3D mode.

As shown in FIGS. 3 and 4, the TFTs T1 to T3 for driving the main pixel unit MP and the switchable black stripe AB are connected to one gate line. Thus, because a separate gate line for selecting the switchable black stripe AB is not necessary, the number of gate lines does not increase.

The sizes and the shapes of the main pixel unit MP and the switchable black stripe AB of one pixel may be properly designed in consideration of driving characteristics of the liquid crystal display panel DPNL, a luminance of a display image, a viewing angle of the 3D image, characteristics of applied products, etc.

The 3D control line G3D is divided into two or more 3D control lines. The switchable black stripes AB may be divided and driven by the two 3D control lines G3D1 and G3D2 which are divided from the 3D control line G3D in a vertical direction of the liquid crystal display panel DPNL as shown in FIG. 3. In this instance, an AC (alternating current) voltage is supplied to gate electrodes of the TFTs of the switchable black stripes AB formed in an upper half block of the liquid crystal display panel DPNL through the first 3D control line G3D1 formed in the upper half block. Further, the AC voltage is supplied to gate electrodes of the TFTs of the switchable black stripes AB formed in a lower half block of the liquid crystal display panel DPNL through the second 3D control line G3D2 formed in the lower half block. As shown in FIG. 10A, FIG. 10B, FIG. 10C, and FIG. 11, the 3D control line may be divided into three 3D control lines: G3D1, G3D2, and G3D3. Alternatively, as shown in FIG. 12A, 12B, 12C, 12D, and FIG. 13, the 3D control line may be divided into four 3D control lines: G3D1, G3D2, G3D3, and G3D4.

The patterned retarder PR is attached to an upper polarizing plate of the liquid crystal display panel DPNL. Referring back to FIG. 1, the patterned retarder PR includes a first phase delay pattern 300a opposite odd-numbered lines in a pixel array of the liquid crystal display panel DPNL and a second phase delay pattern 300b opposite even-numbered lines in the pixel array. Optical axes of the first phase delay pattern 300a and the second phase delay pattern 300b are orthogonal to each other. Each of the first phase delay pattern 300a and the second phase delay pattern 300b may be implemented by a birefringent medium which delays a phase of incident light by a quarter wavelength. The pattern retarder PR may be implemented as a glass patterned retarder GPR based on a glass substrate or a film patterned retarder FPR based on a film substrate.

On the display screen of the liquid crystal display panel DPNL, odd-numbered lines may display a left eye image, and even-numbered lines may display a right eye image. In this instance, light of the left eye image displayed on the odd-numbered lines of the pixel array passes through the upper polarizing plate and is converted into linearly polarized light. Then, the linearly polarized light of the left eye image is incident on the first phase delay pattern 300a of the patterned retarder PR. Further, light of the right eye image displayed on the even-numbered lines of the pixel array passes through the upper polarizing plate and is converted into linearly polarized light. Then, the linearly polarized light of the right eye image is incident on the second phase delay pattern 300b of the patterned retarder PR. In other words, the linearly polarized light of the left eye image and the linearly polarized light of the right eye image are incident on the patterned retarder PR as linearly polarized light having the same optical axis by passing through the upper polarizing plate. The linearly polarized light of the left eye image incident on the patterned retarder PR through the upper polarizing plate is phase-delayed by a phase difference value of the first phase delay pattern 300a of the patterned retarder PR, passes through the first phase delay pattern 300a, and is converted into left circularly polarized light. The linearly polarized light of the right eye image incident on the patterned retarder PR through the upper polarizing plate is phase-delayed by a phase difference value of the second phase delay pattern 300b of the patterned retarder PR, passes through the second phase delay pattern 300b, and is converted into right circularly polarized light.

A left eye polarizing filter of the polarized glasses 310 passes through only left circularly polarized light, and a right eye polarizing filter of the polarized glasses 310 passes through only right circularly polarized light. Thus, when a viewer wears the polarized glasses 310 in the 3D mode, he or she sees only pixels displaying the left eye image with his/her left eye and sees only pixels displaying the right eye image with his/her right eye, thereby having a stereoscopic feeling due to binocular disparity.

Referring to FIG. 1, the stereoscopic image display according to the embodiment includes a data driving circuit 102, a gate driving circuit 103, a 3D control voltage generation circuit 100, a data formatter 105, and a timing controller 101.

The data driving circuit 102 latches digital video data RGB of the 2D and 3D images under the control of the timing controller 101. The data driving circuit 102 converts the digital video data RGB into an analog positive gamma compensation voltage and an analog negative gamma compensation voltage in response to a polarity control signal POL and inverts a polarity of the data voltage. The data driving circuit 102 outputs positive and negative data voltages to the data lines D1 to Dm in response to a source output enable SOE. In the 2D mode, the data driving circuit 102 outputs the data voltages of a 2D image, which is not divided into a left eye image and a right eye image. In the 3D mode, the data driving circuit 102 supplies the data voltage of a left eye image and the data voltage of a right eye image to the data lines D1 to Dm.

The gate driving circuit 103 includes a shift register, a level shifter, and the like. The gate driving circuit 103 sequentially supplies a gate pulse (or scan pulse) synchronized with a data voltage Vdata (refer to FIG. 5) to the gate lines G1 to Gn under the control of the timing controller 101. The gate pulse swings between a gate low voltage Vgl (refer to FIG. 5) and a gate high voltage Vgh (refer to FIG. 5).

In the 2D mode, the 3D control voltage generation circuit 100 supplies the gate low voltage Vgl to the 3D control lines G3D1 to G3D4 under the control of the timing controller 101. In the 3D mode, the 3D control voltage generation circuit 100 generates AC voltages shown in FIGS. 5, 9, 11, and 13. The AC voltage shown in FIGS. 5, 9, 11, and 13 swings between a 3D control voltage V3D and the gate low voltage Vgl. In the AC voltage supplied to the 3D control lines G3D1 to G3D4, a rising time, at which a voltage rises, and a falling time, at which a voltage falls, change in the cycle of a short period of time, so that a noise of a line pattern following a boundary between the blocks of the liquid crystal display panel DPNL does not appear in the screen of the liquid crystal display panel DPNL.

The data formatter 105 receives 3D image data from a host system 104. The data formatter 105 divides the 3D image data into left eye image data and right eye image data on each line and transmits them to the timing controller 101. In the 2D mode, the data formatter 105 transmits 2D image data received from the host system 104 as it is to the timing controller 101.

The timing controller 101 receives timing signals (not shown) such as a vertical sync signal Vsync, a horizontal sync signal Hsync, a data enable DE, and a main clock CLK from the host system 104 through the data formatter 105. The timing controller 101 generates timing control signals for controlling an operation timing of the data driving circuit 102 and an operation timing of the gate driving circuit 103 using the timing signals.

The timing control signals include a gate timing control signal for controlling the operation timing of the gate driving circuit 103 and a data timing control signal for controlling the operation timing of the data driving circuit 102 and the polarity of the data voltage. The timing controller 101 receives a mode selection signal SEL (not shown) from the host system 104 and may switch between an operation of the 2D mode and an operation of the 3D mode of each of the data driving circuit 102 and the gate driving circuit 103.

The gate timing control signal includes a gate start pulse GSP, a gate shift clock GSC, and a gate output enable GOE. The gate start pulse GSP controls a start operation timing of the gate driving circuit 103. The gate shift clock GSC is a clock for shifting the gate start pulse GSP. The gate output enable GOE controls an output timing of the gate driving circuit 103. The gate timing control signal is generated in the 2D mode and the 3D mode.

The data timing control signal includes a source start pulse SSP, a source sampling clock SSC, a polarity control signal POL, and a source output enable SOE. The source start pulse SSP controls a data sampling start timing of the data driving circuit 102. The source sampling clock SSC is a clock for shifting the source start pulse SSP and controls a sampling timing of data. The polarity control signal POL controls a polarity inversion timing of the data voltage output from the data driving circuit 102. The source output enable SOE controls a data voltage output timing and a charge sharing timing of the data driving circuit 102. If the digital video data to be input to the data driving circuit 102 is transmitted in a mini low voltage differential signaling (LVDS) interface standard, the source start pulse SSP and the source sampling clock SSC may be omitted.

The timing controller 101 multiplies an input frame frequency by 'i' to obtain a frame frequency of (f×i) Hz, where 'i' is a positive integer, and f is the input frame frequency. Hence, the timing controller 101 may control the operation timings of the driving circuits 102 and 103 based on the frame frequency of (f×i) Hz. The input frame frequency is 50 Hz in a phase alternate line (PAL) scheme and 60 Hz in a national television standards committee (NTSC) scheme.

The host system 104 supplies 2D and 3D image data and the timing signals Vsync, Hsync, DE, and CLK (not shown) to the timing controller 101 through an interface such as an LVDS interface and a transition minimized differential signaling (TMDS) interface. The host system 104 may supply the mode selection signal SEL indicating the 2D mode or the 3D mode to the timing controller 101. The host system 104 supplies the 2D and 3D image data and the timing signals Vsync, Hsync, DE, and CLK to the timing controller 101 through the data formatter 105.

A user may select the 2D mode or the 3D mode using a user input device 110. The user input device 110 includes a touch screen, an on-screen display (OSD), a keyboard, a mouse, a remote controller, etc. which are attached to the liquid crystal display panel DPNL or mounted inside the liquid crystal display panel DPNL.

The host system 104 switches between an operation of the 2D mode and an operation of the 3D mode in response to user data received through the user input device 110. The host system 104 detects a 2D/3D identification code encoded to data of an input image, for example, a 2D/3D identification code capable of being coded to an electronic program guide (EPG) or an electronic service guide (ESG) of a digital broadcasting standard, thereby distinguishing between the 2D mode and the 3D mode.

FIGS. 3 and 4 are circuit diagrams showing a pixel of the liquid crystal display panel DPNL.

As shown in FIG. 4, the main pixel unit MP includes the first TFT T1, a first liquid crystal cell Clc1, and a first storage capacitor Cst1.

The first TFT T1 supplies a data voltage from the data line D1 to the first liquid crystal cell Clc1 and the first storage capacitor Cst1 in response to a gate pulse from the gate line G1. A gate electrode of the first TFT T1 is connected to the gate line G1. A drain electrode of the first TFT T1 is connected to the data line D1, and a source electrode thereof is connected to a pixel electrode PIX1 of the first liquid crystal cell Clc1 and a first electrode of the first storage capacitor Cst1.

In the 2D mode, the first liquid crystal cell Clc1 is charged to a data voltage of a 2D image supplied to the pixel electrode PIX1 through the first TFT T1 and displays data of the 2D image. In the 3D mode, the first liquid crystal cell Clc1 is charged to a data voltage of a 3D image supplied to the pixel electrode PIX1 through the first TFT T1 and displays data of the 3D image. Liquid crystal molecules of the first liquid crystal cell Clc1 are driven by an electric field between the pixel electrode PIX1, to which the data voltage is supplied, and the common electrode COM1, to which a common voltage Vcom is supplied, and adjusts light transmittance. The first storage capacitor Cst1 includes the first electrode connected to the pixel electrode PIX1 of the first liquid crystal cell Clc1, a second electrode to which the common voltage Vcom is supplied, and a dielectric layer formed between the first and second electrodes. The first storage capacitor Cst1 is connected to the first liquid crystal cell Clc.

The common voltage Vcom is supplied to the common electrode COM1 of the first liquid crystal cell Clc1 and the second electrode of the first storage capacitor Cst1 through the common voltage supply line COM.

The switchable black stripe AB includes the second TFT T2 and the third TFT T3, a second liquid crystal cell Clc2, and a second storage capacitor Cst2.

The first TFT T1 and second TFT T2 are simultaneously turned on or off in response to a gate pulse from the same gate line. The second TFT T2 is turned on simultaneously with the first TFT T1 in response to the gate pulse from the gate line G1 and supplies the data voltage from the data line D1 to the second liquid crystal cell Clc2 and the second storage capacitor Cst2. A gate electrode of the second TFT T2 is connected to the gate line G1, to which the gate electrode of the first TFT T1 is connected. A drain electrode of the second TFT T2 is connected to the data line D1 to which the drain electrode of the first TFT T1 is connected. A source electrode of the second TFT T2 is connected to the pixel electrode PIX2 of the second liquid crystal cell Clc2 and a first electrode of the second storage capacitor Cst2.

A drain-source current of the third TFT T3 is adjusted based on the 3D control voltage V3D applied to the 3D control line G3D. The 3D control line G3D is divided between the blocks of the liquid crystal display panel DPNL. Thus, the 3D control line G3D is formed as an individual gate line in each block. The 3D control line G3D simultaneously controls the switchable black stripes AB of one block. In the 2D mode, the third TFT T3 is held in an off-state. On the other hand, in the 3D mode, the third TFT T3 forms a current path between the second liquid crystal cell Clc2 and second storage capacitor Cst2 and a common voltage source based on the 3D control voltage V3D from the 3D control line G3D, and discharges the voltage of the second liquid crystal cell Clc2 and the voltage of the second storage capacitor Cst2 up to the voltage of the black gray level. In one embodiment, the voltage of the black gray level is the common voltage Vcom or a voltage similar to the common voltage Vcom. The common voltage Vcom ranges from 6V to 8V. A gate electrode of the third TFT T3 is connected to the 3D control line G3D. A drain electrode of the third TFT T3 is connected to the pixel electrode PIX2 of the second liquid crystal cell Clc2 and the first electrode of the second storage capacitor Cst2. A source electrode of the third TFT T3 is connected to the common electrode COM2 of the second liquid crystal cell Clc2 and a second electrode of the second storage capacitor Cst2.

In the 2D mode, the second liquid crystal cell Clc2 is charged to the data voltage of the 2D image supplied to the pixel electrode PIX2 through the second TFT T2 and displays data of the 2D image. In the 3D mode, the second liquid crystal cell Clc2 is discharged up to the voltage of the black gray level along with the second storage capacitor Cst2. Thus, the second liquid crystal cell Clc2 represents the black gray level and serves as the black stripe in the 3D mode. Liquid crystal molecules of the second liquid crystal cell Clc2 are driven by an electric field between the pixel electrode PIX2, to which the data voltage is supplied, and the common electrode COM2, to which the common voltage Vcom is supplied, and adjusts light transmittance. The second storage capacitor Cst2 includes the first electrode connected to the pixel electrode PIX2 of the second liquid crystal cell Clc2, the second electrode to which the common voltage Vcom is supplied, and a dielectric layer formed between the first and second electrodes. The second storage capacitor Cst2 is connected to the second liquid crystal cell Clc2. Hence, the second storage capacitor Cst2 keeps the voltage of the second liquid crystal cell Clc2 constant in the 2D mode and is discharged up to the voltage of the black gray level along with the second liquid crystal cell Clc2 in the 3D mode.

Figure 5:
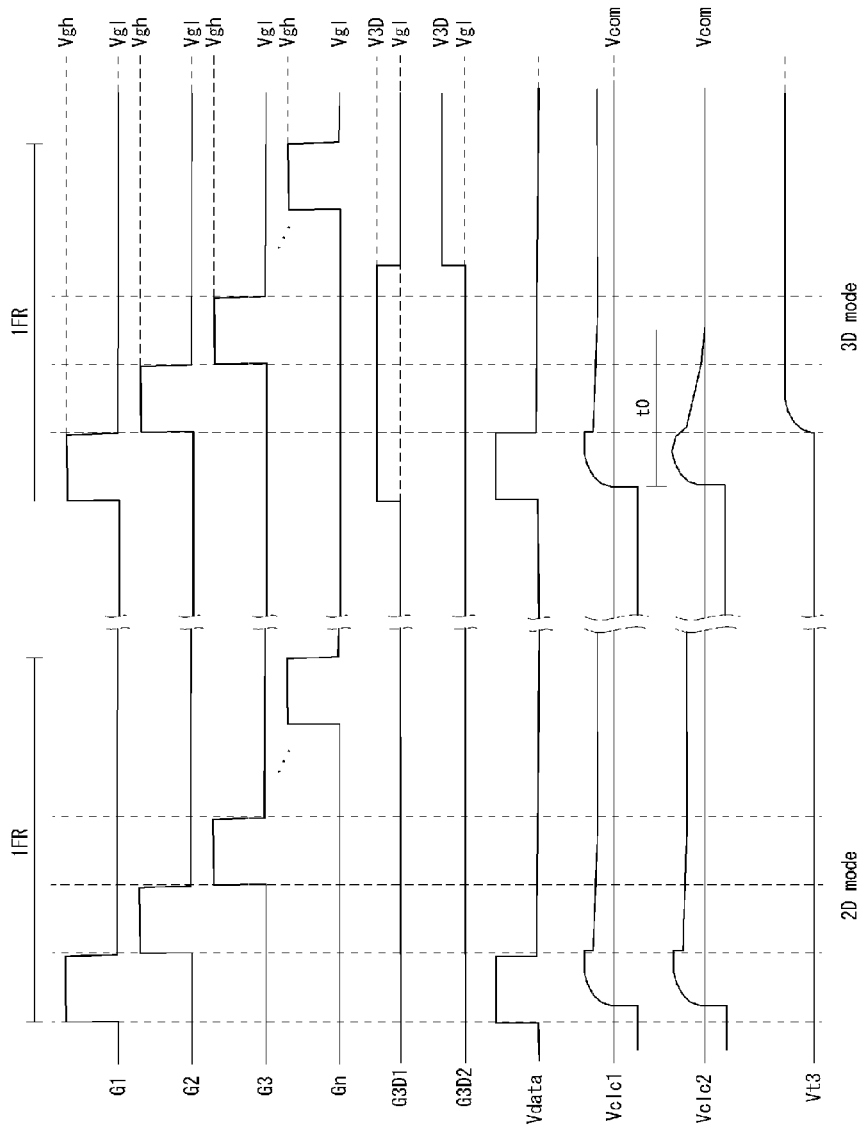
FIG. 5 is a waveform diagram showing a gate pulse, a 3D control voltage, a data voltage, a liquid crystal cell voltage, and a gate voltage of a third thin film transistor.
Figure 6:
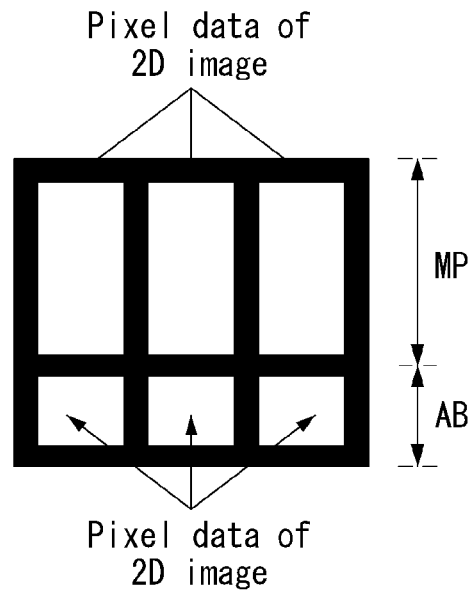
FIG. 6 illustrates an operation of a switchable black stripe in a 2D mode according to one embodiment.
Figure 7:
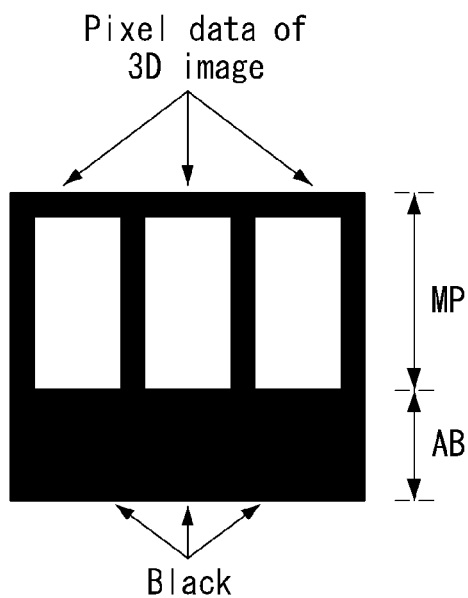
FIG. 7 illustrates an operation of a switchable black stripe in a 3D mode according to one embodiment.

FIG. 5 illustrates a waveform diagram showing the gate pulse, the 3D control voltage V3D, the data voltage Vdata, liquid crystal cell voltages Vclc1 and Vclc2, and a gate voltage Vt3 of the third TFT T3. In FIG. 5, "1FR" denotes one frame period. FIG. 6 illustrates an operation of the switchable black stripe AB in the 2D mode. FIG. 7 illustrates an operation of the switchable black stripe AB in the 3D mode.

As shown in FIGS. 5 to 7, in the 2D mode, the gate pulse synchronized with the data voltage Vdata are sequentially supplied to the gate lines G1 to Gn. The gate pulse swings between the gate low voltage Vgl and the gate high voltage Vgh. The gate low voltage Vgl ranges from −5V to 0V, which is less than a threshold voltage of the TFTs T1 to T3. The gate high voltage Vgh ranges from 20V to 28V, which is greater than the threshold voltage of the TFTs T1 to T3. In the 2D mode, the pixels of the pixel array are sequentially selected on a per line basis and are charged to the data voltage Vdata of the 2D image. The main pixel unit MP and the switchable black stripe AB included in the same pixel PIX are simultaneously charged to the data voltage Vdata of the 2D image. In the 2D mode, the liquid crystal cells Clc1 and Clc2 of the main pixel unit MP and the switchable black stripe AB are held at the data voltage Vdata of the 2D image using the storage capacitors Cst1 and Cst2 during one frame period 1FR.

In the 2D mode, voltages of the 3D control lines G3D1 and G3D2 are held at the gate low voltage Vgl. Thus, the third TFT T3 is held in the off-state. The main pixel unit MP and the switchable black stripe AB operate substantially in the same manner in the 2D mode. As shown in FIG. 6, the main pixel unit MP and the switchable black stripe AB are simultaneously charged to the data voltage Vdata of the 2D image and are held at the data voltage Vdata during one frame period 1FR.

In the 3D mode, the gate pulse is sequentially supplied to the gate lines G1 to Gn. The gate pulse swings between the gate low voltage Vgl and the gate high voltage Vgh. The pixels of the pixel array are sequentially selected on a per line basis and are charged to the data voltage Vdata of the 3D image (i.e., the data voltage Vdata of a left or right eye image). The 3D control voltage V3D is supplied to the 3D control lines G3D1 and G3D2 after a predetermined time. The 3D control voltage V3D is equal to or greater than the threshold voltage of the third TFT T3. The 3D control voltage V3D may be set to be greater than the common voltage Vcom and less than the gate high voltage Vgh, so that the on-current of the third TFT T3 is less than the on-current of the first TFT T1 and second TFT T2. Thus, the third TFTs T3 of the switchable black stripes AB commonly connected to the 3D control lines G3D1 and G3D2 are simultaneously turned on by the 3D control voltage V3D applied to the gate electrodes of the third TFTs T3.

The voltage of the liquid crystal cells Clc2 and the storage capacitors Cst2 of the switchable black stripes AB is discharged to the common voltage source through the third TFTs T3, and thus is discharged up to the voltage of the black gray level. Thus, in the 3D mode, the main pixel unit MP is charged to the data voltage Vdata of the 3D image and then is held at the data voltage Vdata during one frame period 1FR. On the other hand, as shown in FIG. 7, the switchable black stripe AB is discharged up to the voltage of the black gray level through the third TFT T3 and then is held at the voltage of the black gray level during one frame period 1FR.

In the 3D mode, the 3D control voltage V3D is less than the gate high voltage Vgh, and thus the on-current of the third TFT T3 is less than the on-current of the first and second TFTs T1 and T2. In the 3D mode, if the gate voltage of the third TFT T3 is as high as the gate high voltage Vgh, the on-current of the third TFT T3 may increase to the same level as the second TFT T2. If the on-current of the third TFT T3 increases, the data voltage Vdata of the 3D image supplied to the data line D1 may be discharged up to the voltage of the liquid crystal cell Clc1 and the storage capacitor Cst1 of the main pixel unit MP through the second and third TFTs T2 and T3. Thus, the on-current of the third TFT T3 is set to be less than the on-current of the first and second TFTs T1 and T2 to prevent distortion of the data voltage Vdata of the 3D image charged to the main pixel unit MP in the 3D mode. For this, the 3D control voltage V3D may be set to be greater than the common voltage Vcom and less than the gate high voltage Vgh.

Figure 11:
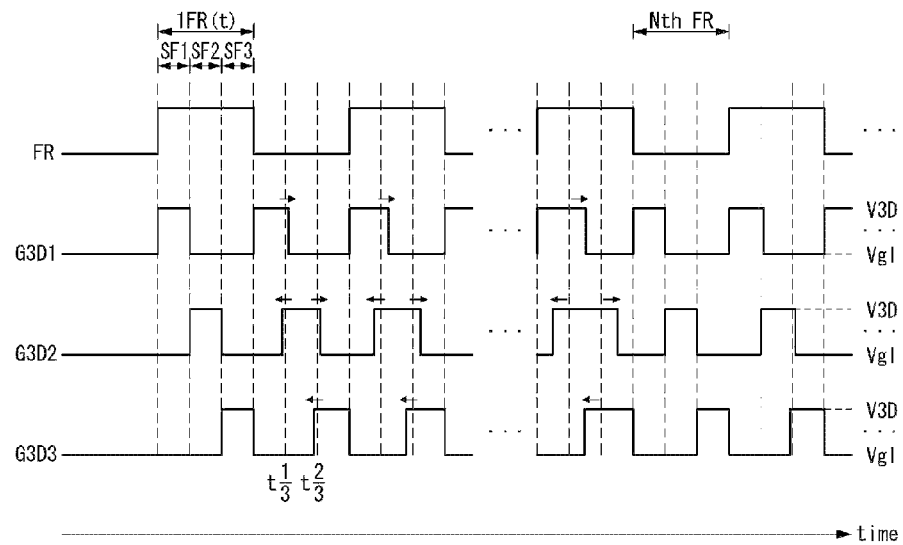
FIG. 11 is a waveform diagram of AC voltages respectively supplied to first to third 3D control lines when a screen of a stereoscopic image display is driven in a 3-division driving manner in a 3D mode.
Figure 12A:
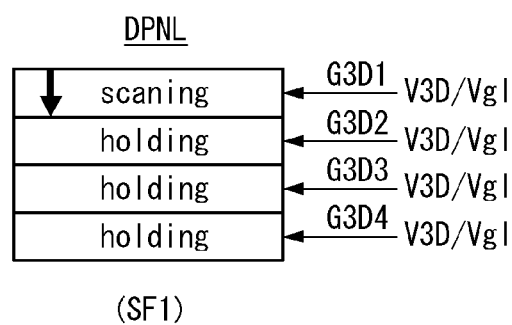
FIGS. 12A, 12B, 12C, and 12D illustrate a screen of a stereoscopic image display driven in a 4-division driving manner in a 3D mode according to one embodiment.
Figure 12B:
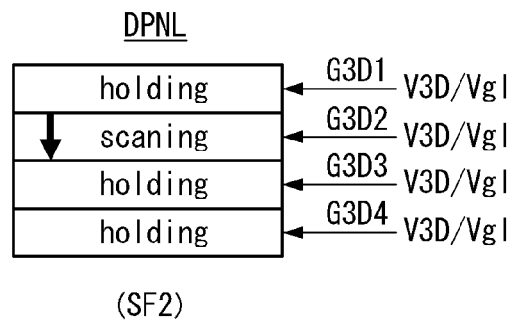
Figure 12C:
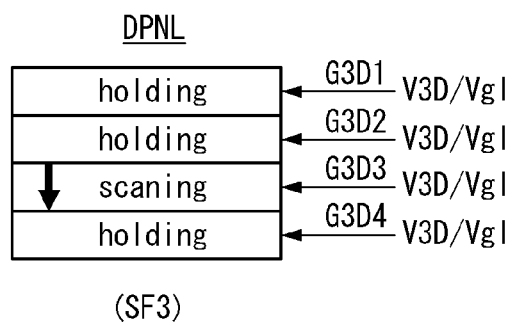
Figure 12D:
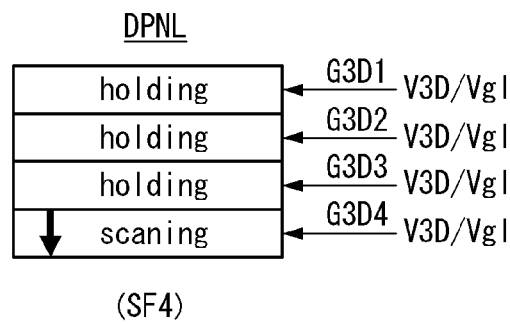
Figure 13:
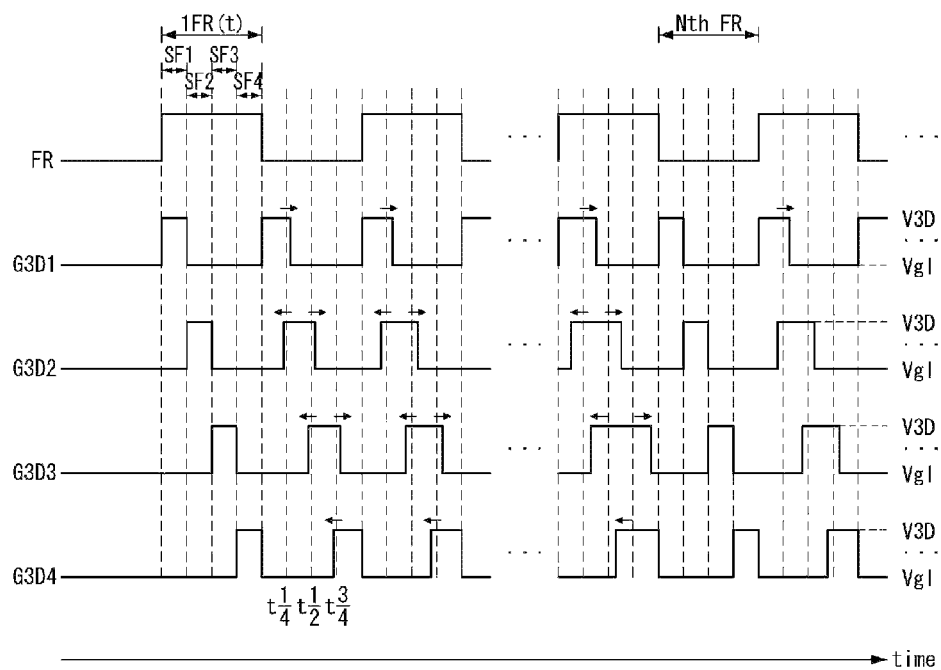
FIG. 13 is a waveform diagram of AC voltages respectively supplied to first to fourth 3D control lines when a screen of a stereoscopic image display is driven in a 4-division driving manner in a 3D mode.

Because the on-current of the third TFT T3 is low in the 3D mode, it takes a time t0 to discharge the liquid crystal cell Clc2 of the switchable black stripe AB up to the voltage of the black gray level. Further, the AC voltage needs to be applied to the 3D control line G3D in the 3D mode, so as to compensate for a gate bias stress of the third TFT T3. When the AC voltage is applied to the 3D control line G3D, a rising time and a falling time of the AC voltage may change at the same point in time of each frame period. In this instance, the voltage of the common electrodes COM1 and COM2 electrically coupled with the 3D control line G3D may change at the same point in time of each frame period. As a result, an observer may perceive a phenomenon, in which a luminance of pixels of the same position changes in each frame period. A noise appears at the same position (for example, a boundary between the blocks) of each frame period. Thus, as shown in FIGS. 9, 11, and 13, at least one of the rising time and the falling time of the AC voltage in each frame period is differentially controlled, so as to secure a sufficient discharge time of the switchable black stripe AB, compensate for the gate bias stress of the third TFT T3, and prevent the appearance of the noise resulting from the AC voltage applied to the 3D control line G3D.

Figure 8A:
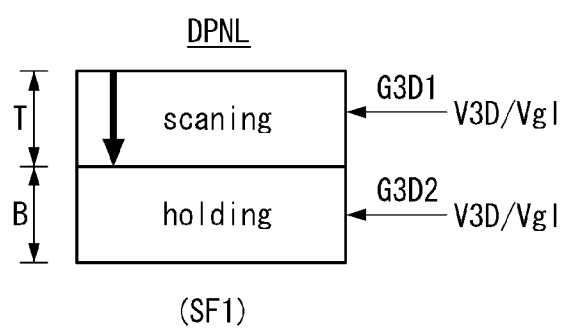
FIGS. 8A and 8B illustrate a screen of a stereoscopic image display driven in a 2-division driving manner in a 3D mode according to one embodiment.
Figure 8B:
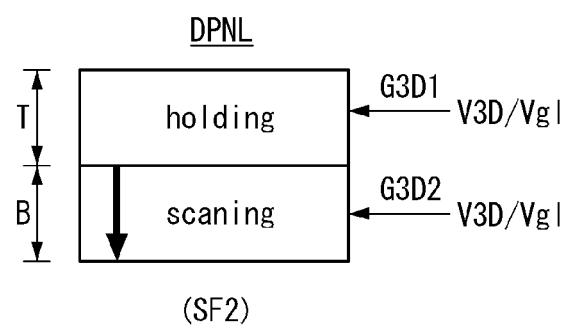

FIGS. 8A and 8B illustrate the screen of the stereoscopic image display driven in a 2-division driving manner in the 3D mode according to one embodiment. In FIGS. 8A and 8B, "scanning" indicates a block, in which data to be written to the pixels is scanned, and "holding" indicates a block, in which data of the pixels is held. FIG. 9 is a waveform diagram of AC voltages respectively supplied to the first and second 3D control lines when the screen of the stereoscopic image display is driven in the 2-division driving manner in the 3D mode.

Figure 9:
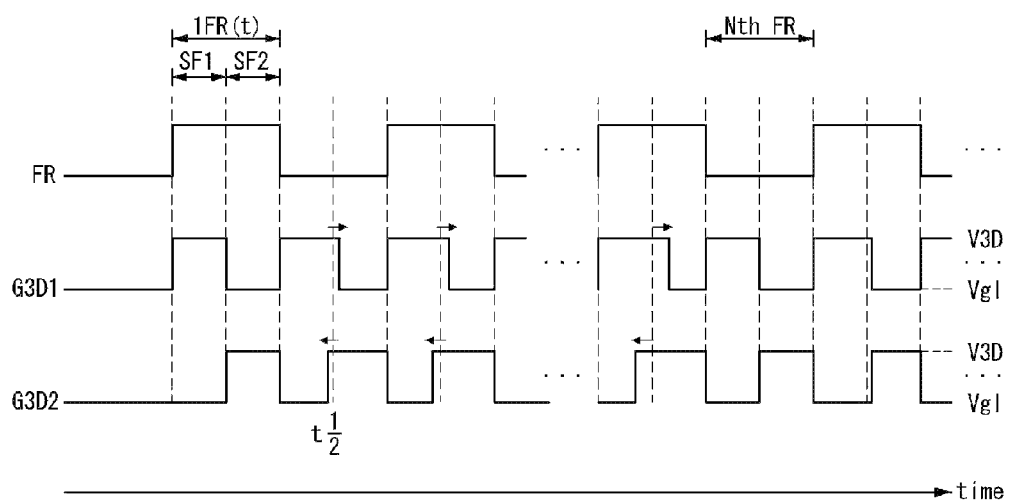
FIG. 9 illustrates a waveform diagram of AC voltages respectively supplied to first and second 3D control lines when a screen of a stereoscopic image display is driven in a 2-division driving manner in a 3D mode.

As shown in FIGS. 8A to 9, the liquid crystal display panel DPNL includes a first 3D control line G3D1 used to drive the switchable black stripes AB of a first block T and a second 3D control line G3D2 used to drive the switchable black stripes AB of a second block B. The first block T may be an upper half block of the liquid crystal display panel DPNL, and the second block B may be a lower half block of the liquid crystal display panel DPNL.

A phase of a second AC voltage applied to the second 3D control line G3D2 is later than a phase of a first AC voltage applied to the first 3D control line G3D1. A high voltage period (i.e., a V3D period) of the first AC voltage is set to a period SF1 ranging from the beginning to about half of one frame period 1FR(t). A high voltage period of the first AC voltage in a current frame period is set to be longer than a high voltage period of the first AC voltage in a previous frame period. Namely, the high voltage period of the first AC voltage gradually increases by a certain period of time in each frame period. After a predetermined period of time passed, the high voltage period of the first AC voltage is reset to a default time. A high voltage period (i.e., a V3D period) of the second AC voltage is set to a period SF2 ranging from about half to the end of one frame period 1FR(t). A high voltage period of the second AC voltage in a current frame period is set to be longer than a high voltage period of the second AC voltage in a previous frame period. Namely, the high voltage period of the second AC voltage gradually increases by a certain period of time in each frame period. After a predetermined period of time passed, the high voltage period of the second AC voltage is reset to a default time.

The first AC voltage applied to the first 3D control line G3D1 has a rising time, which is fixed at the same point in time of each frame period, and a falling time, which is delayed by a previously determined time in each frame period. The falling time of the first AC voltage may be delayed by about 1 μsec in each frame period. In this instance, if the falling time of the first AC voltage in a first frame period is set to a half frame period, the falling time of the first AC voltage in a second frame period may be delayed by about 1 μsec from a half frame period, and then the falling time of the first AC voltage in a third frame period may be delayed by about 2 μsec from a half frame period. The rising time of the first AC voltage may be fixed at a predetermined point in time of a vertical blank period determined before advancing to a next frame period. In the vertical blank period, there is no input image and the liquid crystal display panel is not scanned. When reaching an Nth frame period after a predetermined period of time passed, where N is a positive integer equal to or greater than 3, the falling time of the first AC voltage is reset to a previously determined default falling time (for example, a half frame period). The process is repeatedly performed in the cycle of N frame periods. Thus, the high voltage period of the first AC voltage in each frame period becomes longer than a previous frame period until reaching the Nth frame period.

The second AC voltage applied to the second 3D control line G3D2 has a rising time, which is advanced by a previously determined time in each frame period, and a falling time, which is fixed at the same point in time of each frame period. The rising time of the second AC voltage may be advanced by about 1 μsec in each frame period. In this instance, if the rising time of the second AC voltage in the first frame period is set to a half frame period, the rising time of the second AC voltage in the second frame period may be advanced by about 1 μsec from a half frame period, and then the rising time of the second AC voltage in the third frame period may be advanced by about 2 μsec from a half frame period. The falling time of the second AC voltage may be fixed at a predetermined point in time of a vertical blank period determined before advancing to a next frame period. When reaching the Nth frame period after a predetermined period of time passed, the rising time of the second AC voltage is reset to a previously determined default rising time (for example, a half frame period). The process is repeatedly performed in the cycle of N frame periods. Thus, the high voltage period of the second AC voltage in each frame period becomes longer than a previous frame period until reaching the Nth frame period.

Figure 10A:
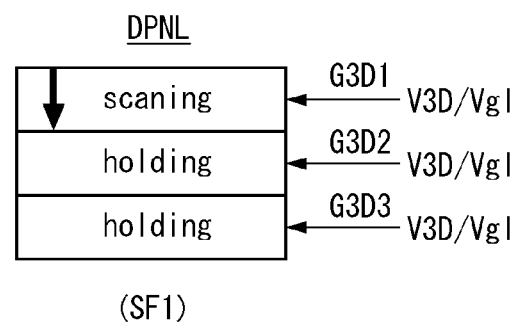
FIGS. 10A, 10B, and 10C illustrate a screen of a stereoscopic image display driven in a 3-division driving manner in a 3D mode according to one embodiment.
Figure 10B:
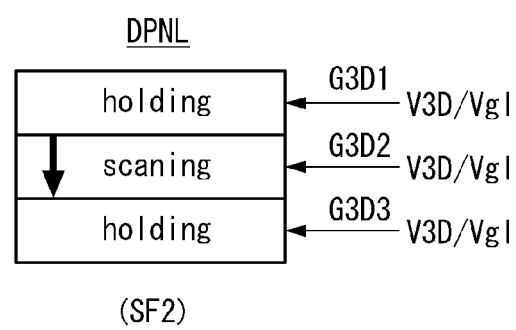
Figure 10C:
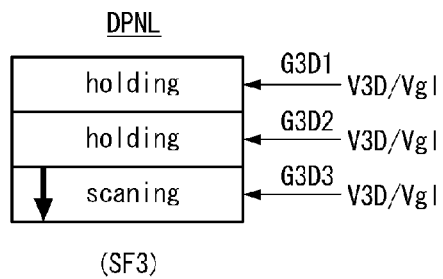

FIGS. 10A to 10C illustrate the screen of the stereoscopic image display driven in a 3-division driving manner in the 3D mode according to one embodiment. FIG. 11 illustrates a waveform diagram of AC voltages respectively supplied to first to third 3D control lines when the screen of the stereoscopic image display is driven in the 3-division driving manner in the 3D mode.

As shown in FIGS. 10A to 10C and FIG. 11, the liquid crystal display panel DPNL includes a first 3D control line G3D1 used to drive the switchable black stripes AB of a first block, a second 3D control line G3D2 used to drive the switchable black stripes AB of a second block, and a third 3D control line G3D3 used to drive the switchable black stripes AB of a third block. If the liquid crystal display panel DPNL is divided into three parts in a vertical direction, the first block may be an upper block of the liquid crystal display panel DPNL, and the third block may be a lower block of the liquid crystal display panel DPNL. The second block may be positioned between the first block and the third block.

A phase of a second AC voltage applied to the second 3D control line G3D2 is later than a phase of a first AC voltage applied to the first 3D control line G3D1. A phase of a third AC voltage applied to the third 3D control line G3D3 is later than the phase of the second AC voltage applied to the second 3D control line G3D2. Thus, the phases of the first to third AC voltages are sequentially shifted. A high voltage period (i.e., a V3D period) of the first AC voltage is set to a period SF1 ranging from the beginning to about one third of one frame period 1FR(t), increases by a certain period of time in each frame period, and is reset after a predetermined period of time passed. A high voltage period (i.e., a V3D period) of the second AC voltage is set to a period SF2 ranging from about one third to about two thirds of one frame period 1FR(t), increases by a certain period of time in each frame period, and is reset after a predetermined period of time passed. A high voltage period (i.e., a V3D period) of the third AC voltage is set to a period SF3 ranging from about two thirds to the end of one frame period 1FR(t), increases by a certain period of time in each frame period, and is reset after a predetermined period of time passed.

The first AC voltage applied to the first 3D control line G3D1 has a rising time, which is fixed at the same point in time of each frame period, and a falling time, which is delayed by a previously determined time in each frame period. The falling time of the first AC voltage may be delayed by about 1 μsec in each frame period. In this instance, if the falling time of the first AC voltage in a first frame period is set to one third of one frame period, the falling time of the first AC voltage in a second frame period may be delayed by about 1 μsec from one third of one frame period, and then the falling time of the first AC voltage in a third frame period may be delayed by about 2 μsec from one third of one frame period. The rising time of the first AC voltage may be fixed at a predetermined point in time of a vertical blank period determined before advancing to a next frame period. When reaching an Nth frame period after a predetermined period of time passed, the falling time of the first AC voltage is reset to a previously determined default falling time (for example, one third of one frame period). The process is repeatedly performed in the cycle of N frame periods. Thus, the high voltage period of the first AC voltage in each frame period becomes longer than a previous frame period until reaching the Nth frame period.

The second AC voltage applied to the second 3D control line G3D2 has a rising time, which is advanced by a previously determined time in each frame period, and a falling time, which is delayed by a previously determined time in each frame period. The rising time of the second AC voltage may be advanced by about 1 μsec in each frame period, and the falling time of the second AC voltage may be delayed by about 1 μsec in each frame period. In this instance, if the rising time of the second AC voltage in the first frame period is set to one third of one frame period and the falling time of the second AC voltage in the first frame period is set to two thirds of one frame period, the rising time of the second AC voltage in the second frame period may be advanced by about 1 μsec from one third of one frame period, and the falling time of the second AC voltage in the second frame period may be delayed by about 1 μsec from two thirds of one frame period. Subsequently, the rising time of the second AC voltage in the third frame period may be advanced by about 2 μsec from one third of one frame period, and the falling time of the second AC voltage in the third frame period may be delayed by about 2 μsec from two thirds of one frame period. When reaching the Nth frame period after a predetermined period of time passed, the rising time of the second AC voltage is reset to a previously determined default rising time (for example, one third of one frame period), and the falling time of the second AC voltage is reset to a previously determined default falling time (for example, two thirds of one frame period). The process is repeatedly performed in the cycle of N frame periods. Thus, the high voltage period of the second AC voltage in each frame period becomes longer than a previous frame period until reaching the Nth frame period.

The third AC voltage applied to the third 3D control line G3D3 has a rising time, which is advanced by a previously determined time in each frame period, and a falling time, which is fixed at the same point in time of each frame period. The rising time of the third AC voltage may be advanced by about 1 μsec in each frame period. In this instance, if the rising time of the third AC voltage in the first frame period is set to two thirds of one frame period, the rising time of the third AC voltage in the second frame period may be advanced by about 1 μsec from two thirds of one frame period, and then the rising time of the third AC voltage in the third frame period may be advanced by about 2 μsec from two thirds of one frame period. The falling time of the third AC voltage may be fixed at a predetermined point in time of a vertical blank period determined before advancing to a next frame period. When reaching the Nth frame period after a predetermined period of time passed, the rising time of the third AC voltage is reset to a previously determined default rising time (for example, two thirds of one frame period). The process is repeatedly performed in the cycle of N frame periods. Thus, the high voltage period of the third AC voltage in each frame period becomes longer than a previous frame period until reaching the Nth frame period.

FIGS. 12A to 12D illustrate the screen of the stereoscopic image display driven in a 4-division driving manner in the 3D mode according to one embodiment. FIG. 13 is a waveform diagram of AC voltages respectively supplied to first to fourth 3D control lines when the screen of the stereoscopic image display is driven in the 4-division driving manner in the 3D mode.

As shown in FIGS. 12A to 12D and FIG. 13, the liquid crystal display panel DPNL includes a first 3D control line G3D1 used to drive the switchable black stripes AB of a first block, a second 3D control line G3D2 used to drive the switchable black stripes AB of a second block, a third 3D control line G3D3 used to drive the switchable black stripes AB of a third block, and a fourth 3D control line G3D4 used to drive the switchable black stripes AB of a fourth block. If the liquid crystal display panel DPNL is divided into four parts in a vertical direction, the first block may be an upper block of the liquid crystal display panel DPNL, and the fourth block may be a lower block of the liquid crystal display panel DPNL. The second block may be positioned between the first block and the fourth block, and the third block may be positioned between the second block and the fourth block.

Referring to FIG. 13, a phase of a second AC voltage applied to the second 3D control line G3D2 is later than a phase of a first AC voltage applied to the first 3D control line G3D1. A phase of a third AC voltage applied to the third 3D control line G3D3 is later than the phase of the second AC voltage applied to the second 3D control line G3D2. A phase of a fourth AC voltage applied to the fourth 3D control line G3D4 is later than the phase of the third AC voltage applied to the third 3D control line G3D3. Thus, the phases of the first to fourth AC voltages are sequentially shifted. A high voltage period (i.e., a V3D period) of the first AC voltage is set to a period SF1 ranging from the beginning to about one fourth of one frame period 1FR(t), increases by a certain period of time in each frame period, and is reset after a predetermined period of time passed. A high voltage period (i.e., a V3D period) of the second AC voltage is set to a period SF2 ranging from about one fourth to about two fourths of one frame period 1FR(t), increases by a certain period of time in each frame period, and is reset after a predetermined period of time passed. A high voltage period (i.e., a V3D period) of the third AC voltage is set to a period SF3 ranging from about two fourths to about three fourths of one frame period 1FR(t), increases by a certain period of time in each frame period, and is reset after a predetermined period of time passed. A high voltage period (i.e., a V3D period) of the fourth AC voltage is set to a period SF4 ranging from about three fourths to the end of one frame period 1FR(t), increases by a certain period of time in each frame period, and is reset after a predetermined period of time passed.

The first AC voltage applied to the first 3D control line G3D1 has a rising time, which is fixed at the same point in time of each frame period, and a falling time, which is delayed by a previously determined time in each frame period. The falling time of the first AC voltage may be delayed by about 1 μsec in each frame period. In this instance, if the falling time of the first AC voltage in a first frame period is set to one fourth of one frame period, the falling time of the first AC voltage in a second frame period may be delayed by about 1

μsec from one fourth of one frame period, and then the falling time of the first AC voltage in a third frame period may be delayed by about 2 μsec from one fourth of one frame period. The rising time of the first AC voltage may be fixed at a predetermined point in time of a vertical blank period determined before advancing to a next frame period. When reaching an Nth frame period after a predetermined period of time passed, the falling time of the first AC voltage is reset to a previously determined default falling time (for example, one fourth of one frame period). The process is repeatedly performed in the cycle of N frame periods. Thus, the high voltage period of the first AC voltage in each frame period becomes longer than a previous frame period until reaching the Nth frame period.

The second AC voltage applied to the second 3D control line G3D2 has a rising time, which is advanced by a previously determined time in each frame period, and a falling time, which is delayed by a previously determined time in each frame period. The rising time of the second AC voltage may be advanced by about 1 μsec in each frame period, and the falling time of the second AC voltage may be delayed by about 1 μsec in each frame period. In this instance, if the rising time of the second AC voltage in the first frame period is set to one fourth of one frame period and the falling time of the second AC voltage in the first frame period is set to two fourths of one frame period, the rising time of the second AC voltage in the second frame period may be advanced by about 1 μsec from one fourth of one frame period, and the falling time of the second AC voltage in the second frame period may be delayed by about 1 μsec from two fourths of one frame period. Subsequently, the rising time of the second AC voltage in the third frame period may be advanced by about 2 μsec from one fourth of one frame period, and the falling time of the second AC voltage in the third frame period may be delayed by about 2 μsec from two fourths of one frame period. When reaching the Nth frame period after a predetermined period of time passed, the rising time of the second AC voltage is reset to a previously determined default rising time (for example, one fourth of one frame period), and the falling time of the second AC voltage is reset to a previously determined default falling time (for example, two fourths of one frame period). The process is repeatedly performed in the cycle of N frame periods. Thus, the high voltage period of the second AC voltage in each frame period becomes longer than a previous frame period until reaching the Nth frame period.

The third AC voltage applied to the third 3D control line G3D3 has a rising time, which is advanced by a previously determined time in each frame period, and a falling time, which is delayed by a previously determined time in each frame period. The rising time of the third AC voltage may be advanced by about 1 μsec in each frame period, and the falling time of the third AC voltage may be delayed by about 1 μsec in each frame period. In this instance, if the rising time of the third AC voltage in the first frame period is set to two fourths of one frame period and the falling time of the third AC voltage in the first frame period is set to three fourths of one frame period, the rising time of the third AC voltage in the second frame period may be advanced by about 1 μsec from two fourths of one frame period, and the falling time of the third AC voltage in the second frame period may be delayed by about 1 μsec from three fourths of one frame period. Subsequently, the rising time of the third AC voltage in the third frame period may be advanced by about 2 μsec from two fourths of one frame period, and the falling time of the third AC voltage in the third frame period may be delayed by about 2 μsec from three fourths of one frame period. When reaching the Nth frame period after a predetermined period of time passed, the rising time of the third AC voltage is reset to a previously determined default rising time (for example, two fourths of one frame period), and the falling time of the third AC voltage is reset to a previously determined default falling time (for example, three fourths of one frame period). The process is repeatedly performed in the cycle of N frame periods. Thus, the high voltage period of the third AC voltage in each frame period becomes longer than a previous frame period until reaching the Nth frame period.

The fourth AC voltage applied to the fourth 3D control line G3D4 has a rising time, which is advanced by a previously determined time in each frame period, and a falling time, which is fixed at the same point in time of each frame period. The rising time of the fourth AC voltage may be advanced by about 1 μsec in each frame period. In this instance, if the rising time of the fourth AC voltage in the first frame period is set to three fourths of one frame period, the rising time of the fourth AC voltage in the second frame period may be advanced by about 1 μsec from three fourths of one frame period, and then the rising time of the fourth AC voltage in the third frame period may be advanced by about 2 μsec from three fourths of one frame period. The falling time of the fourth AC voltage may be fixed at a predetermined point in time of a vertical blank period determined before advancing to a next frame period. When reaching the Nth frame period after a predetermined period of time passed, the rising time of the fourth AC voltage is reset to a previously determined default rising time (for example, three fourths of one frame period). The process is repeatedly performed in the cycle of N frame periods. Thus, the high voltage period of the fourth AC voltage in each frame period becomes longer than a previous frame period until reaching the Nth frame period.

As shown in FIGS. 9, 11, and 13, an overlap time between the high voltage periods of the AC voltages supplied to the 3D control lines G3D1 to G3D4 becomes longer than a previous frame period until reaching the Nth frame period. The overlap time between the high voltage periods of the AC voltages supplied to the 3D control lines G3D1 to G3D4 is reset to a previously determined default overlap time in the Nth frame period.

As shown in FIGS. 9, 11, and 13, the rising time and the falling time of the AC voltage supplied to each of the 3D control lines G3D1 to G3D4 change in the cycle of a short period of time, for example, in the cycle of one frame period to the extent that the observer cannot perceive the noise at the boundary between the blocks. Thus, the stereoscopic image display according to the embodiment may prevent the noise which may appear at the boundary between the blocks when the AC voltages are supplied to the 3D control lines G3D1 to G3D4.

Figure 14:
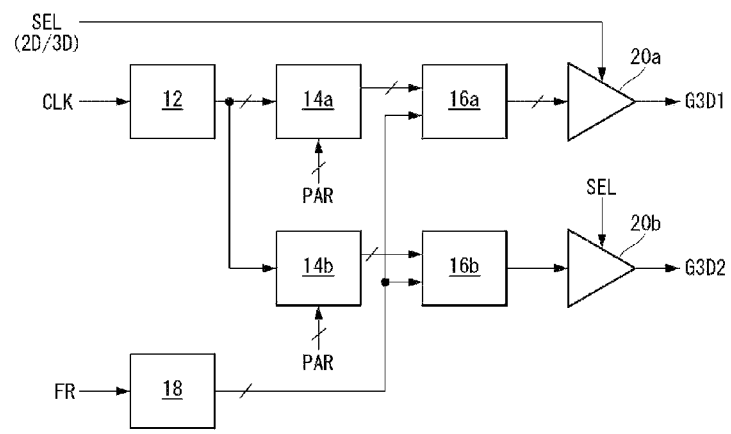
FIG. 14 illustrates a 3D control voltage generation circuit shown in FIG. 2 according to one embodiment.

FIG. 14 illustrates a detailed view of the 3D control voltage generation circuit 100. More specifically, FIG. 14 illustrates a circuit for generating the first and second AC voltages in the 3D control voltage generation circuit 100 and omits the illustration of a circuit for generating the third and fourth AC voltages. Configuration of the circuit for generating the third and fourth AC voltages is substantially the same as the circuit for generating the first and second AC voltages shown in FIG. 14.

As shown in FIG. 14, the 3D control voltage generation circuit 100 includes a clock counter 12, a frame counter 18, a plurality of 3D control voltage generators 14a and 14b, a plurality of 3D control voltage splitters 16a and 16b, and a plurality of output buffers 20a and 20b.

The clock counter 12 counts rising edges or falling edges of a clock signal and supplies a count result to the 3D control voltage generators 14a and 14b. The clock counter 12 resets a clock count value at the beginning of an Nth frame period. An output of the clock counter 12 is used as reference time information for changing the rising time or the falling time of the AC voltage applied to each of the 3D control lines G3D1 and G3D2. The clock signal input to the clock counter 12 may be the main clock CLK received from the host system 104. The main clock CLK has a high frequency of several tens of Hz and is input to the clock counter 12.

The frame counter 18 receives a frame signal, which changes in the cycle of one frame period, and counts rising edges or falling edges of the frame signal. The frame counter 18 supplies a count result to the 3D control voltage splitters 16a and 16b and resets a frame count value at the beginning of the Nth frame period. The frame signal is a timing signal, which is generated in the cycle of one frame period, for example, the vertical sync signal, the gate start pulse GSP, and the polarity control signal POL of a frame inversion standard. An output of the frame counter 18 is used as a reference signal of a frame period count.

Figure 15:
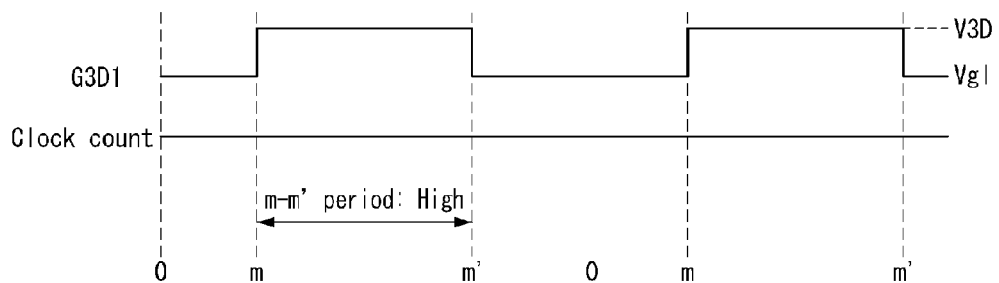
FIG. 15 is a waveform diagram of an operation of the 3D control voltage generator shown in FIG. 14.

Each of the 3D control voltage generators 14a and 14b compares the clock count value received from the clock counter 12 with m and m', which are previously determined, where m is a positive integer, and m' is a positive integer greater than m. Each of the 3D control voltage generators 14a and 14b outputs digital data, which is held at the high logic voltage during a period m-m' (refer to FIG. 15) required to change the clock count value from m to m' and is held at the low logic voltage during other periods. In one embodiment, m and m' are parameters individually assigned to each of the blocks and are updatable values stored in an external memory or an inner memory. The external memory may be implemented as an existing electrically erasable programmable read-only memory (EEPROM) which stores waveform information of the gate timing signal and the data timing signal and provides the timing controller 101 with the waveform information. An output of the first 3D control voltage generator 14a defines a default value of the high voltage period of the first AC voltage, and an output of the second 3D control voltage generator 14b defines a default value of the high voltage period of the second AC voltage.

The 3D control voltage splitters 16a and 16b receive the outputs of the 3D control voltage generators 14a and 14b, respectively. Hence, the 3D control voltage splitters 16a and 16b change the rising time or the falling time of the signal by a certain period of time to thereby increase the high voltage period of the AC voltage by a certain period of time in each frame period. More specifically, the first 3D control voltage splitter 16a receives the output of the first 3D control voltage generator 14a and changes the rising time or the falling time of the signal by a certain period of time, thereby increasing the high voltage period of the first AC voltage by a certain period of time in each frame period. The second 3D control voltage splitter 16b receives the output of the second 3D control voltage generator 14b and changes the rising time or the falling time of the signal by a certain period of time, thereby increasing the high voltage period of the second AC voltage by a certain period of time in each frame period.

The output buffers 20a and 20b control an output voltage in response to the mode selection signal SEL. When the mode selection signal SEL is generated at a low logic level indicating the 2D mode, the output buffers 20a and 20b supply the gate low voltage Vgl to the 3D control lines G3D1 and G3D2 in the 2D mode. On the other hand, when the mode selection signal SEL is generated at a high logic level indicating the 3D mode, the output buffers 20a and 20b supply the AC voltage, which swings between the 3D control voltage V3D and the gate low voltage Vgl, to the 3D control lines G3D1 and G3D2 in the 3D mode. The output buffers 20a and 20b supply the 3D control voltage V3D to the 3D control lines G3D1 and G3D2 during the high voltage period in the output of the 3D control voltage splitters 16a and 16b, and supply the gate low voltage Vgl to the 3D control lines G3D1 and G3D2 during a low voltage period in the output of the 3D control voltage splitters 16a and 16b. An output of the first output buffer 20a is supplied to the first 3D control line G3D1, and an output of the second output buffer 20b is supplied to the second 3D control line G3D2.

As described above, the stereoscopic image display according to one embodiment includes the switchable black stripes, which display the image data in the 2D mode and represent the black gray level in the 3D mode, in the liquid crystal display panel, thereby widening the vertical viewing angle and increasing the luminance and the aperture ratio of the 2D image.

The stereoscopic image display according to one embodiment supplies the AC voltage to the 3D control lines for controlling the switchable black stripes of the liquid crystal display panel, thereby compensating for the gate bias stress of the TFTs of the switchable black stripes and preventing a reduction in the driving characteristics of the TFTs. Furthermore, the stereoscopic image display according to one embodiment changes the high voltage period of the AC voltage in each frame period, thereby preventing the noise which may appear when the AC voltage changes at the same point in time of each frame period.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A stereoscopic image display comprising:
   a liquid crystal display panel including data lines, gate lines crossing the data lines, a common electrode to which a common voltage is supplied, a plurality of three-dimensional (3D) control lines to which an alternating current (AC) voltage is supplied, a first plurality of pixels included in a first portion of the liquid crystal display panel, and a second plurality of pixels included in a second portion of the liquid crystal display panel, each pixel divided into a main pixel unit and an switchable black stripe;
   a data driving circuit configured to supply a data voltage of a two-dimensional (2D) image to the data lines in a 2D mode and supply a data voltage of a 3D image to the data lines in a 3D mode;
   a gate driving circuit configured to sequentially supply a gate pulse, which swings between a gate low voltage and a gate high voltage, to the gate lines in the 2D mode and the 3D mode; and
   a 3D control voltage generation circuit configured to supply a first AC voltage to the first plurality of pixels and a second AC voltage to the second plurality of pixels via the 3D control lines in the 3D mode, wherein a phase of the first AC voltage supplied to the first plurality of pixels is shifted from a phase of the second AC voltage supplied to the second plurality of pixels and wherein the 3D control voltage generation circuit increases a high voltage period of the first AC voltage and the second AC voltage in a current frame period to be longer than a high voltage period of the first AC voltage and the second AC voltage in a previous frame period, and the 3D control voltage generation circuit resets the high voltage period of the first AC voltage and the second AC voltage to a previously determined default time after a predetermined period of time passed;

wherein each of the switchable black stripes is discharged up to a voltage of a black gray level during a high voltage period of each of the AC voltages supplied through the 3D control lines.

2. The stereoscopic image display of claim 1, wherein the 3D control voltage generation circuit gradually increases the high voltage period of the first AC voltage and the second AC voltage in each successive frame period and resets the high voltage period after the predetermined period of time passed.

3. The stereoscopic image display of claim 1, wherein the first AC voltage and the second AC voltage alternate between the gate low voltage and a 3D control voltage and wherein the 3D control voltage generation circuit supplies the 3D control voltage to the 3D control lines during the high voltage period of the first AC voltage and the second AC voltage and supplies the gate low voltage to the 3D control lines during a low voltage period of the first AC voltage and the second AC voltage in the 3D mode, wherein the 3D control voltage generation circuit supplies the gate low voltage to the 3D control lines in the 2D mode, wherein the 3D control voltage is greater than the common voltage and is less than the gate high voltage.

4. The stereoscopic image display of claim 3, wherein in the 3D mode, the 3D control voltage generation circuit delays a falling time of the first AC voltage supplied to a first 3D control line by a period of time in each frame period, and resets the falling time of the first AC voltage to a default falling time when reaching the predetermined period of time, wherein in the 3D mode, the 3D control voltage generation circuit advances a rising time of the second AC voltage supplied to a second 3D control line by a period of time in each frame period, and resets the rising time of the second AC voltage to a default rising time when reaching the predetermined period of time.

5. The stereoscopic image display of claim 4, wherein in the 3D mode, the 3D control voltage generation circuit delays a falling time of the second AC voltage by a period of time in each frame period, and resets the falling time of the second AC voltage to a second default falling time after the predetermined period of time passed.

6. The stereoscopic image display of claim 4, wherein an overlap time between a high voltage period of the first AC voltage and a high voltage period of the second AC voltage increases in each successive frame period, and resets to a default overlap time after the predetermined period of time passed.

7. The stereoscopic image display of claim 1, wherein the main pixel unit of each pixel includes a first thin film transistor that supplies a data voltage from the data line to a first liquid crystal cell and a first storage capacitor in response to the gate pulse from the gate line, wherein the switchable black stripe of each pixel includes a second thin film transistor, that supplies the data voltage from the data line to a second liquid crystal cell and a second storage capacitor in response to the gate pulse from the gate line, and a third thin film transistor, that discharges a voltage of the second liquid crystal cell and a voltage of the second storage capacitor up to the common voltage in response to an AC voltage from the 3D control line.

* * * * *